US008346968B2

(12) United States Patent
Ait-Ameur et al.

(10) Patent No.: US 8,346,968 B2
(45) Date of Patent: Jan. 1, 2013

(54) PROACTIVE DNS QUERY SYSTEM BASED ON CALL FLOW ANALYSIS

(75) Inventors: Samir Ait-Ameur, Fremont, CA (US); Imtiaz Shaikh, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 587 days.

(21) Appl. No.: 12/637,307

(22) Filed: Dec. 14, 2009

(65) Prior Publication Data
US 2011/0145316 A1   Jun. 16, 2011

(51) Int. Cl.
*G06F 15/16* (2006.01)
*G06F 15/173* (2006.01)
(52) U.S. Cl. .................. 709/245; 709/223; 709/224
(58) Field of Classification Search .................. 709/223, 709/224, 245
See application file for complete search history.

(56) References Cited

U.S. PATENT DOCUMENTS

| 6,836,805 B1* | 12/2004 | Cook ............................ 709/245 |
| 6,907,429 B2* | 6/2005 | Carneal et al. ....................... 1/1 |
| 7,020,719 B1* | 3/2006 | Grove et al. ................... 709/238 |
| 7,343,397 B2* | 3/2008 | Kochanski ..................... 709/218 |
| 2005/0289312 A1* | 12/2005 | Ghosal et al. ................ 711/167 |
| 2008/0059565 A1* | 3/2008 | Turner et al. .................. 709/203 |
| 2010/0049872 A1* | 2/2010 | Roskind ....................... 709/245 |

\* cited by examiner

*Primary Examiner* — Aaron Strange

(57) ABSTRACT

DNS requests associated with a network call flow may be proactively predicted. A method may include receiving a model relating DNS queries to DNS queries that are likely to be subsequently issued by other network devices; receiving a first DNS query, the first DNS query being received from a first network device; predicting additional DNS queries that are likely to be issued by the other network devices; and transmitting responses to the predicted DNS queries to other network devices.

23 Claims, 11 Drawing Sheets

US 8,346,968 B2

PROACTIVE DNS QUERY SYSTEM BASED ON CALL FLOW ANALYSIS

BACKGROUND

In an increasingly networked world, more and more traffic, such as data, voice, and video, is transmitted over public and proprietary networks. Wireless networks, in particularly, are becoming increasingly popular as networks through which subscribers obtain both voice services (e.g., telephone calls) and data services (e.g., email and web surfing).

In both wired and wireless networks, users may access resources using textual meaningful identifiers as an "address" for the resource. For example, the domain name "verizon.com" may be entered by a user to access a web site hosted by the company Verizon Communications Inc. Internally, the user's computing device may translate the textual domain "verizon.com" into a numerical internet protocol (IP) address that may be used by the computing device to access the requested resource. This translation may be performed based on requests to a Domain Name System (DNS), which is a distributed database used to translate the textual domain names, which are meaningful to humans, into the numerical identifiers associated with networking equipment for the purpose of locating and addressing these devices.

DNS servers may handle DNS translation requests from devices in the network. Because network devices may generally need to wait for a response to a DNS request from the DNS server before accessing the desired resource, efficiently processing DNS translation requests can be important in optimizing network performance.

DETAILED DESCRIPTION

The following detailed description refers to the accompanying drawings. The same reference numbers in different drawings may identify the same or similar elements. Also, the following detailed description does not limit the invention.

The terms "call flow," "flow sequence," "call sequence" or "data flow," as used herein, may refer to the sequence of communications performed in a network to implement a voice or data session with a client communication device. The sequence of communications may be performed by different network devices involved in implementing the voice or data session.

Implementations described herein may include networks that include a number of network devices that may query a DNS server. The network devices may include, for instance, a number of devices that operate in a call sequence in a wireless network. The DNS server may analyze the network devices accessed in previous call flows to predict DNS requests that are likely to occur as a result of a current call flow. The DNS server may then proactively "respond" to these predicted requests. Advantageously, latency caused by DNS server requests in a call flow can be decreased.

Figure 1:
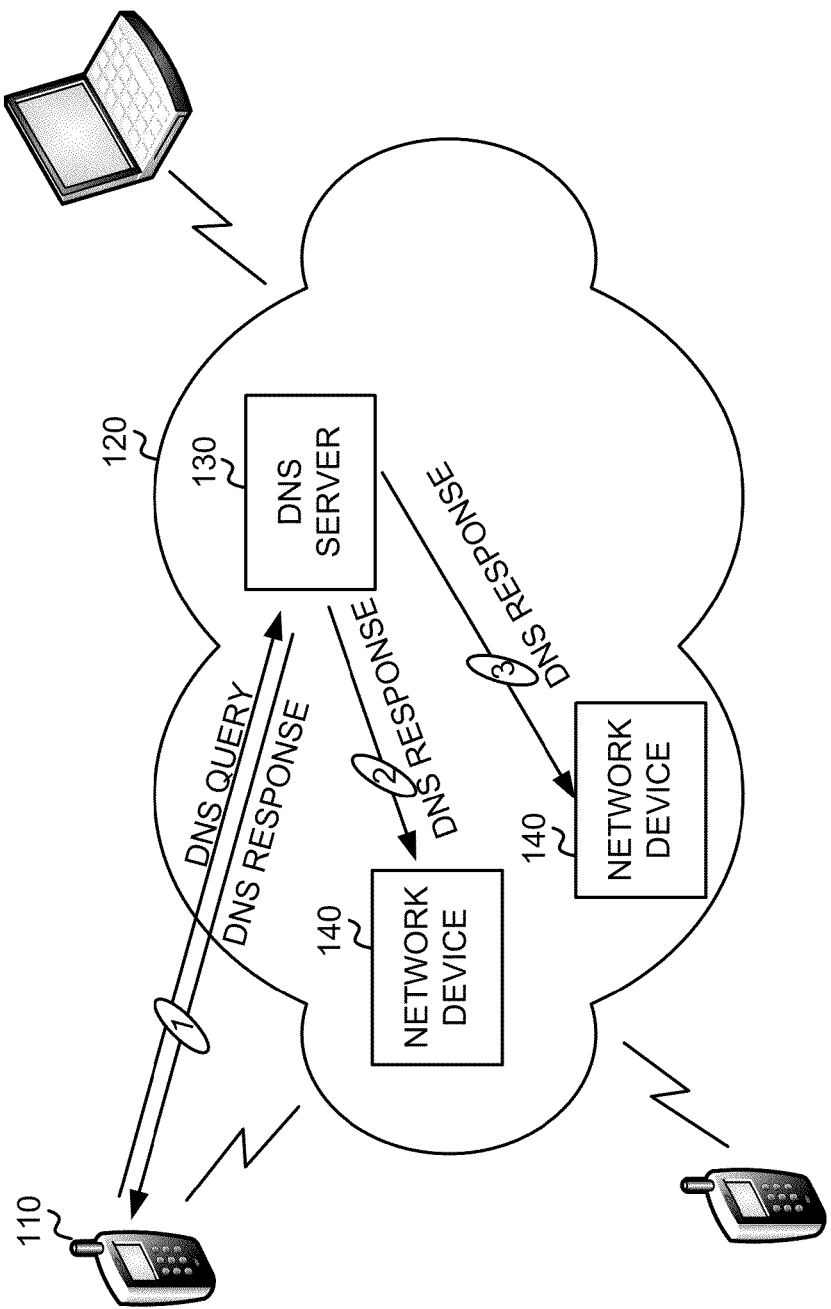
FIG. 1 is a diagram illustrating concepts described herein.

FIG. 1 is a diagram illustrating concepts described herein. As shown in FIG. 1, assume a user device, such as mobile phone 110, wirelessly connects to network 120 to receive voice and/or data services. Network 120 may include a number of network devices 130 and 140 that collectively implement network 120. One such network device may be DNS server 130. Other network devices 140 may include routers, gateways, or devices that implement other signaling or data transportation functions.

During a voice or data session formed with network 120, mobile phone 110 may query DNS server 130 to resolve a domain name into a numeric IP address. An exemplary DNS query is shown in FIG. 1. In the illustrated signals labeled (1), mobile phone 110 initiates a DNS query and receives a result for the DNS query ("DNS response") back from DNS server 130. Other network devices 140 may be involved in handling the voice or data session. These network devices may also perform DNS queries as part of the call flow, for either the same or different domain names, as mobile phone 110. Conventionally, other network devices 140 may each query DNS server 130 and receive a response back from DNS server 130, in a manner similar to signals (1). Consistent with aspects described herein, however, DNS server 130 may anticipate the DNS queries from network devices 140 and send the anticipated DNS responses to network devices 140. Network devices 140 may not need to make the actual DNS queries. DNS server 130 may anticipate the DNS queries based on, for example, an analysis of the session call flow and the relationship between the network devices involved in implementing the communication session. This is shown in the signals labeled (2) and (3) in FIG. 1, in which DNS responses from DNS server 130 are sent to network devices 140 without network devices 140 first sending a corresponding DNS query.

Figure 2:
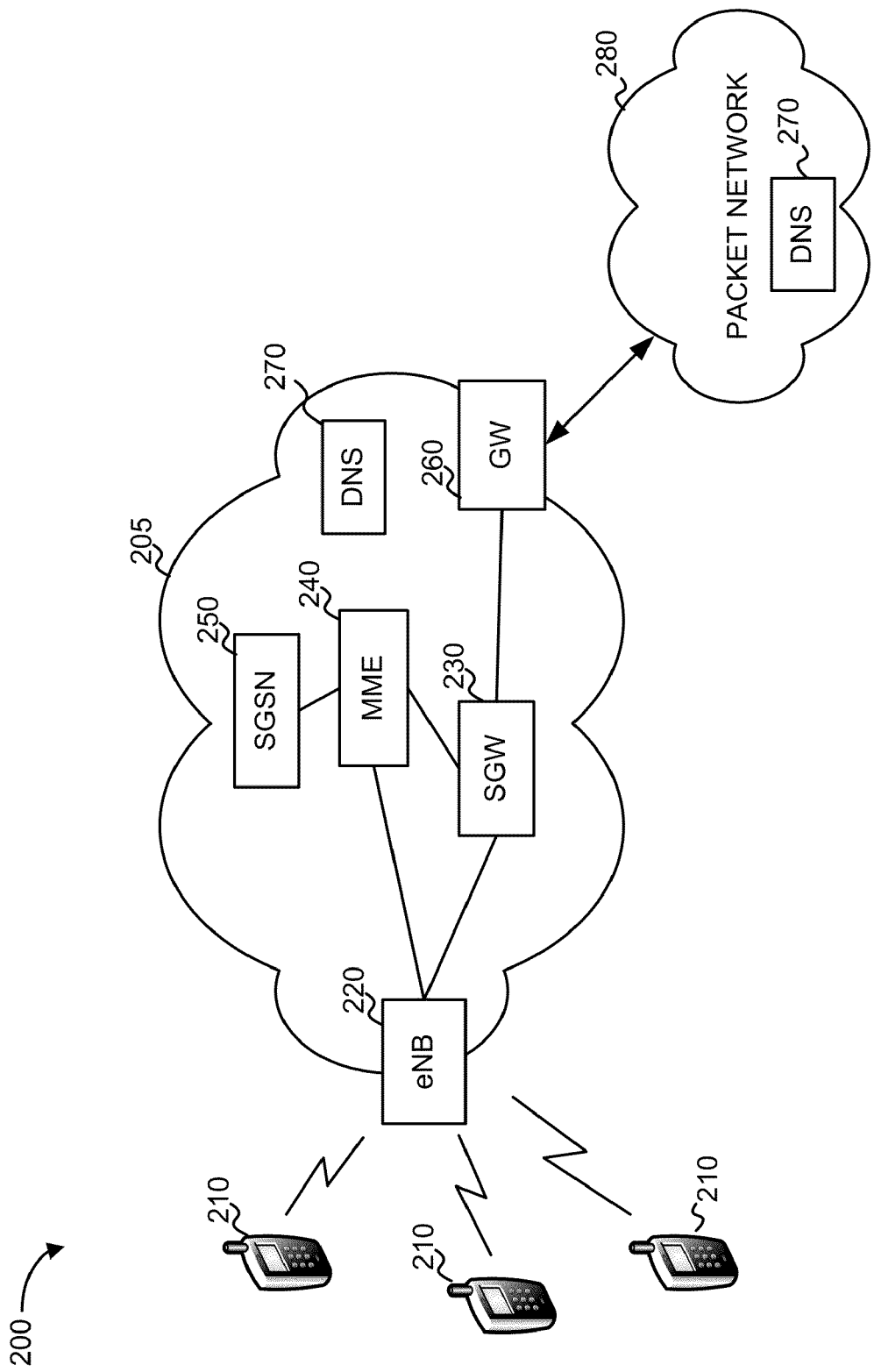
FIG. 2 is a diagram illustrating an exemplary system.

FIG. 2 is a diagram illustrating an exemplary system 200. System 200 generally illustrates a wireless communication system based on the Long Term Evolution (LTE) mobile communication standard. In alternative implementations, other communication standards could be used.

As shown in FIG. 2, system 200 may include one or more computing devices 210, such as mobile phones, that connect to a first network 205. A second network 280 may connect to first network 205. First network 205 may represent elements in a network designed to provide wireless telecommunication access to computing devices 210. First network 205 may connect to second network 280, which may be a packet-based network, such as the Internet.

Computing devices 210 may generally include devices designed to communicate with network 205. Computing devices 210 may include, for example, mobile telephones, smart phones, electronic notepads, laptops, personal computers, and/or personal digital assistants (PDA). Computing devices 210 may establish wireless communication sessions with network 205. The wireless communication sessions may be used for voice (e.g., telephone calls) and/or data sessions.

As previously mentioned, first network 205 may include components of a wireless network. In one exemplary implementation, and as illustrated, first network 205 may include components that implement an LTE-based network. Other network technologies, such as IP multimedia subsystem (IMS), International Mobile Telecommunications-2000 ("3G"), or second-generation wireless telephone technology ("2G"), may alternatively or additionally be implemented.

As particularly shown in FIG. 2, the components of first network 205 may include radio access node (eNB) 220 (e.g., a base station), serving gateway (SGW) 230, mobility management entity (MME) 240, serving GPRS (General Packet Radio Service) support node (SGSN) 250, network gateway (GW) 260, and DNS 270. DNS 270, although shown in first network 205, may alternatively or additionally be implemented in second network 280.

Radio access node 220 may provide an interface for computing devices 210. Radio access node 220 may include, from a network access perspective, the PHYsical (PHY) layer, a medium access control (MAC) layer, a radio link control (RLC) layer, and a packet data control protocol (PDCP) layer. Radio access node 220 may also offer radio resource control (RRC) functionality corresponding to the control plane. Radio access node 220 may perform many functions including radio resource management, admission control, scheduling, cell broadcast, ciphering/deciphering of user and control plane data, and compression/decompression of user plane packet headers.

SGW 230 may route and forward user data packets while also acting as the mobility anchor for the user plane during inter radio access node 220 handovers and as an anchor for mobility between LTE and other technologies. For idle state computing devices 210, SGW 230 may terminate the data path and trigger paging when data arrives for the idle computing device 210. SGW 230 may additionally manage and store computing device 210 contexts, e.g. parameters of the IP bearer service and network internal routing information. SGW 230 may also perform replication of user traffic in case of lawful interception.

MME 240 may act as a control-node for network 205. MME 240 may be responsible for idle mode tracking of computing devices 210. MME 240 may function in the network bearer activation/deactivation process and may also be responsible for choosing an SGW 230 for a computing device 210 when the computing device comes online and at handover of the computing device. MME 240 may also be responsible authenticating the user of the client device. MME 240 may also be the termination point in network 205 for ciphering/integrity protection for network signaling.

SGSN 250 may implement delivery of data packets from and to client devices 210 within its geographical service area. SGSN 250 may perform packet routing and transfer, mobility management (attach/detach and location management), logical link management, and authentication and charging functions.

GW 260 may provide connectivity to external networks, such as second network 280. A computing device 210 may have simultaneous connectivity with more than one GW to multiple additional networks. GW 260 may perform policy enforcement, packet filtering for each user, charging support, lawful interception, and packet screening.

DNS 270 may include one or more servers that act to translate text-based domain names into numerical IP addresses that are used to route information in networks such as network 205 and 208. DNS 270 will be described in more detail below.

Second network 280 may include, for example, a public packet-based network, such as the Internet. Second network 280 may also include DNS servers, such as DNS 270.

Although FIG. 2 illustrates exemplary components of system 200, in other implementations, system 200 may include additional, fewer, different, or differently arranged components than those illustrated in FIG. 2 and described herein. For example, first network 205 may normally include many radio access nodes 220. Additionally, while lines are used FIG. 2 to illustrate connectivity between components in FIG. 2, in alternative implementations, the components of FIG. 2 may be connected to one another in different configurations.

Figure 3:
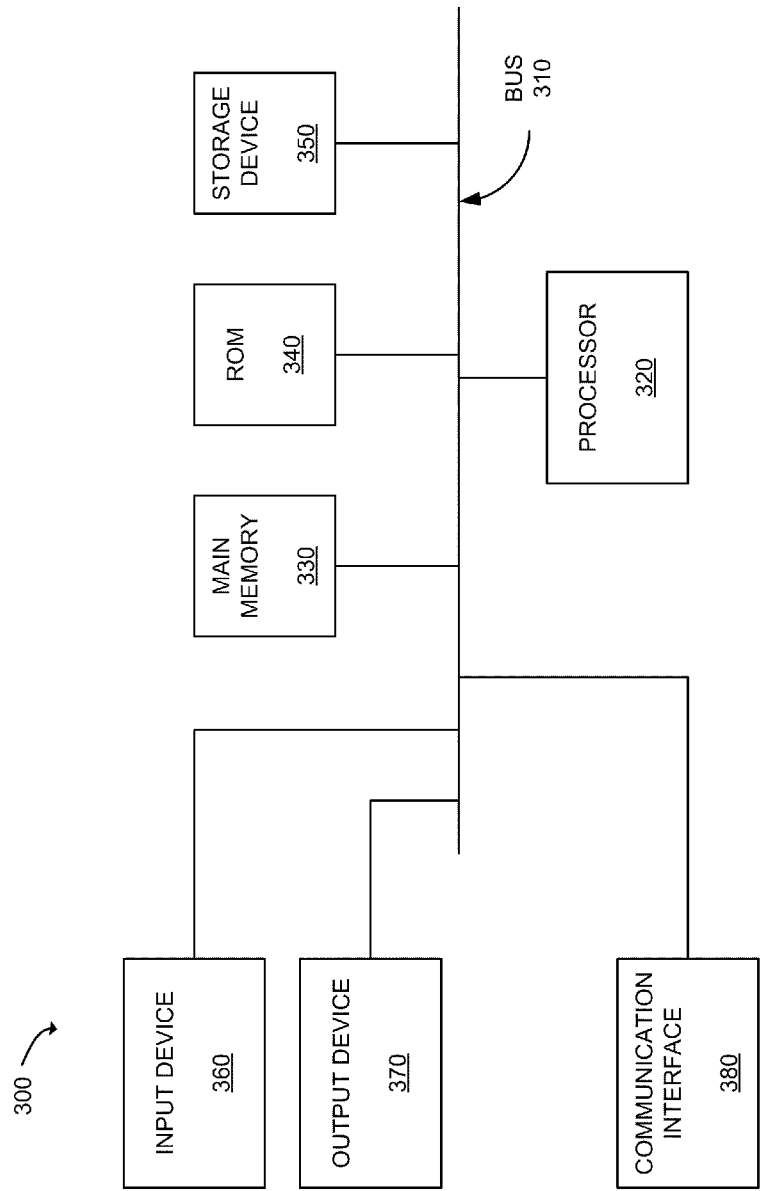
FIG. 3 is a diagram of exemplary components of a device, such as a network device.

FIG. 3 is a diagram of exemplary components of a device, such as a network device in networks 205/280, labeled as network device 300. As shown in FIG. 3, network device 300 may include a bus 310, a processor 320, a main memory 330, a read only memory (ROM) 340, a storage device 350, an input device 360, an output device 370, and a communication interface 380. In another implementation, network device 300 may include additional, fewer, different, or differently arranged components than are illustrated in FIG. 3.

Bus 310 may include a path that permits communication among the components of device 300. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to network device 300, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the client/server entity to communicate with other devices and/or systems. For example, communication interface 380 may include mechanisms for communicating with another network device.

As will be described in detail below, network device 300 may perform certain operations relating to DNS queries. Device 300 may perform these operations in response to processor 320 executing software instructions contained in a computer-readable medium, such as memory 330. A computer-readable medium may be defined as a logical or physical memory device. A logical memory device may include a space within a single physical memory device or spread across multiple physical memory devices.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

In one particular implementation, software instructions, such as instructions stored in memory 330 of device 300 implementing DNS server 270, may anticipate DNS requests, based on call flow patterns, from other network devices (such as SGW 230, MME 240, and/or radio access node 220) and issue responses to the anticipated DNS requests prior to receiving the DNS requests.

Although FIG. 3 illustrates exemplary components of network device 300, in other implementations, network device 300 may include additional, fewer, different, or differently arranged components than those illustrated in FIG. 3 and described herein. In some implementations, input device 360 and/or output device 370 may not be implemented by device 300. For example, device 300 may represent a network device such as radio access node 220, SGW 230, MME 240, GW 260, or DNS 270. In these situations, device 300 may be a "headless" device that does not explicitly include an input or an output device.

Figure 4:
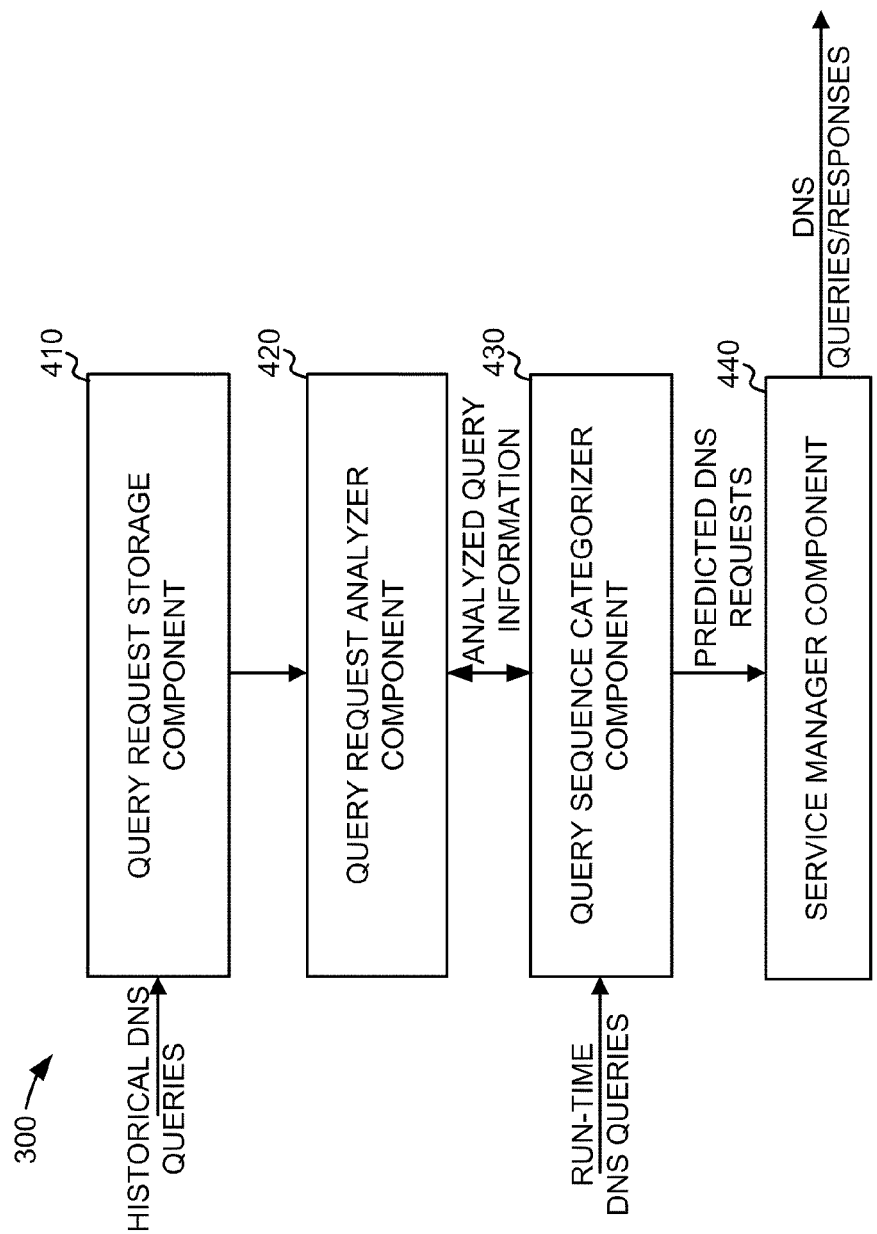
FIG. 4 is a diagram illustrating exemplary functional components of the network device shown in FIG. 3.

FIG. 4 is a diagram illustrating exemplary functional components of network device 300. In practice, the functional components shown in FIG. 4 may be implemented in, for example, DNS 270. Alternatively, the functional components shown in FIG. 4 may be implemented in another network device. In this case, the network device may issue requests on behalf of network devices involved in the call flow (such as SGW 230, MME 240, and radio access node 220) to a DNS server. The functional components illustrated in FIG. 4 may be implemented by hardware (e.g., one or more processors or other processing logic, and one or more memories) or a combination of hardware and software in device 300.

As shown in FIG. 4, network device 300 may include a query request storage component 410, a query request analyzer component 420, a query sequence categorizer component 430, and a service manager component 440.

Query request storage component 410 may receive DNS queries from various network devices involved in providing telecommunication services to computing devices 210. Query request storage component 410 may store these queries, possibly along with additional information relating to the requests, in a computer-readable medium. For example, a database may be used to store the DNS query requests. In situations in which network device 300 is implemented as part of DNS 270, query request storage component 410 may receive the DNS queries as part of the normal network call flow. In situations in which network device 300 is implemented as another network device, a copy of the DNS queries may be sent to network device 300 or forwarded to network device 300.

Figure 5:
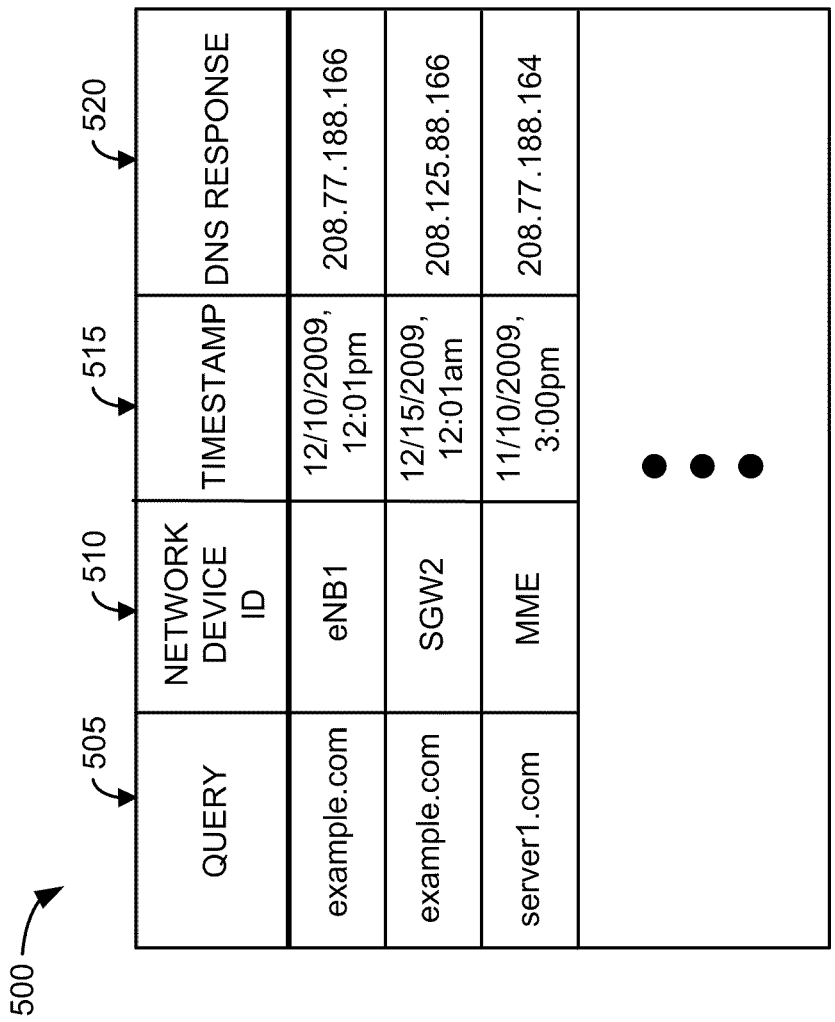
FIG. 5 is a diagram illustrating exemplary storage of DNS queries.

FIG. 5 is a diagram of a table 500, such as a table or database stored in computer-readable media of network device 300, illustrating exemplary storage of DNS queries by query request storage component 410. Each row of table 500 may correspond to a DNS query received from a network device, such as radio access node 220, SGW 230, MME 240, SGSN 250, or GW 260. Each row may include a query field 505, a network device ID field 510, a timestamp field 515, and a DNS response field 520.

Query field 505 may include the domain name corresponding to the DNS query received by query request storage component 410. As shown in FIG. 5, exemplary domain names that are being queried by the network devices include "example.com" and "server1.com." Multiple network devices involved in a call flow may submit separate DNS queries to DNS 270. The DNS queries may be for the same or different domain names.

Network device ID field 510 may identify the network device making the DNS query request. In table 500, network devices are identified by a textual label, such as eNB1, SGW2, or MME. In alternative implementations, the network devices may be identified based on other identifiers, such as a label that identifies the type of the network device and the IP address of the network device.

Timestamp field 515 may include a timestamp identifying when the DNS request was performed.

DNS response field 520 may indicate what the response was for the DNS query. The DNS response may be a numerical IP address corresponding to the network resource identified by query field 505.

FIG. 5 illustrates exemplary fields in table 500. In other implementations, table 500 may include additional, fewer, different, or differently arranged fields than those illustrated in FIG. 5 and described herein.

Referring back to FIG. 4, query request analyzer component 420 may interact with query request storage component 410 to map the stored queries in table 500 to call sequences in the network. Query request analyzer component 420 may, for instance, use pre-stored network connectivity information, known call sequence information, and/or queries from query request storage component 410 to determine call sequences in the network. Query request analyzer component 420 may also tabulate additional information relating to the call sequences, such as frequency or likelihood of a call sequence occurring.

Figure 6:
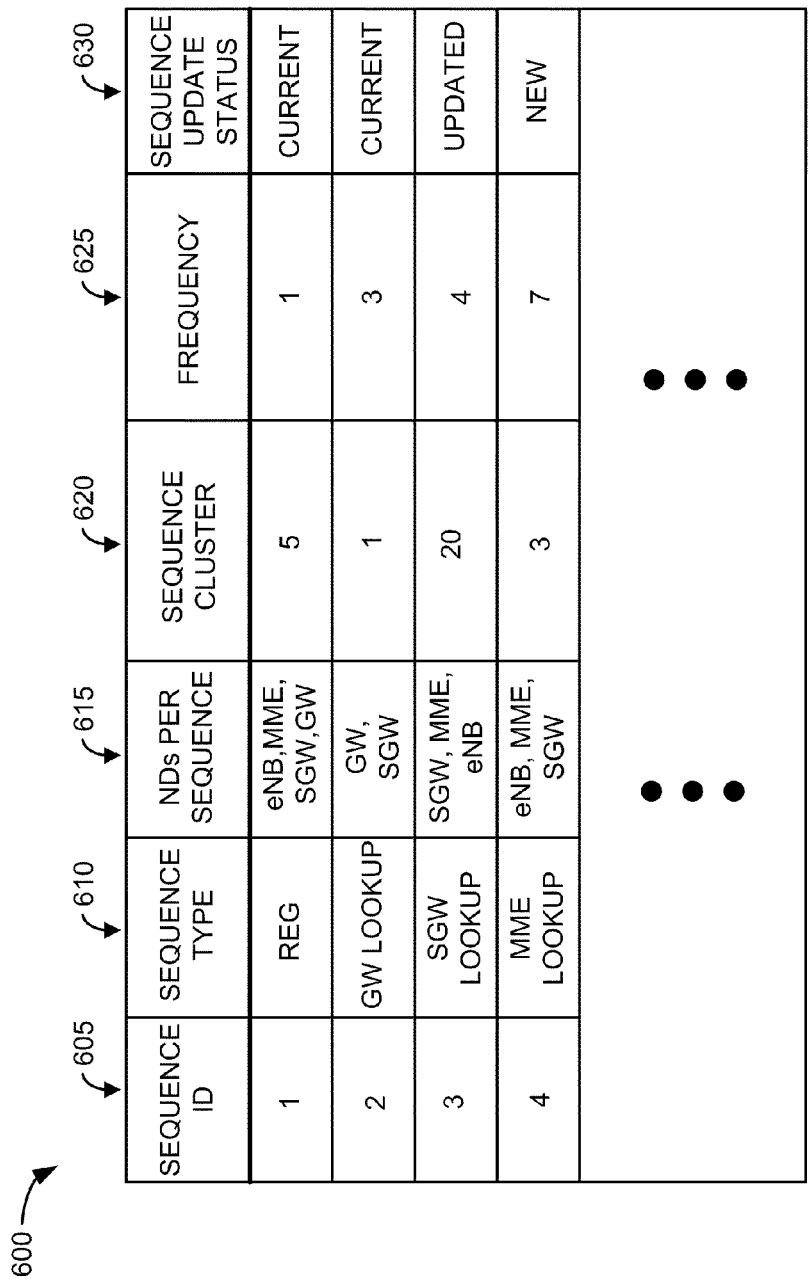
FIG. 6 is a diagram illustrating information generated by a functional component of the network device shown in FIG. 3.

FIG. 6 is a diagram of a table 600, such as a table stored in computer-readable media of network device 300, illustrating information generated by query request analyzer component 420. Each row of table 600 may correspond to a call sequence analyzed or generated by query request analyzer component 420. Each row may include a sequence identifier (ID) field 605, a sequence type field 610, a network devices (NDs) per sequence field 615, a sequence cluster field 620, a frequency field 625, and a sequence update status field 630.

Sequence ID field 605 may store a key or label used to identify the call sequence entry. In FIG. 6, increasing numeric labels (1, 2, 3) are illustrated. Other labels could alternatively be used.

Sequence type field 610 may store a label that identifies a type of the call sequence. The type of the sequence may relate to, for example, the function of the call sequence in the network. In general, labels in type field 610 may be used to categorize the call sequences into categories that may be useful in predicting DNS queries. Exemplary labels are shown in table 600 and include: a registration (REG) label that may indicate that the call sequence is an initial registration of a computing device (i.e., a computing device is initially registering with the network); a gateway lookup (GW LOOKUP) label that may indicate that the call sequence is started in response to GW 260; a serving gateway lookup (SGW LOOKUP) label that may indicate that the call sequence is started in response to SGW 230; and a mobility management entity lookup (MME LOOKUP) label that may indicate that the call sequence is started in response to a request from MME 240.

Network devices (NDs) per sequence field 615 may store an indication of the network devices that are involved in the call sequence. For example, for call sequence one (REG), radio access node 220, MME 240, SGW 230, and GW 260 may all be involved in the call sequence. That is, each of these network devices may issue a DNS request during a registration call sequence. The network devices involved in a particular call sequence may be obtained by query request analyzer component 420 based on an analysis of the data in query request storage component 410 and/or based on other information, such as known network topology or call flow data.

Sequence cluster field 620 may store a label or a set of labels, such as a numerical label, indicating groupings of similar call sequences. Query request analyzer component 420 may determine which call sequences are similar to one another based on an analysis of the queries stored in table 500. Call sequences assigned to the same sequence group may be call sequences in which the predicted DNS requests for the call sequence may be similarly determined.

Frequency field 625 may store an indication of the frequency or likelihood of the particular call sequence being performed in the network relative to other call sequences. Query request analyzer component 420 may calculate values for frequency field 625 based on a historical analysis of DNS requests obtained from table 500. In one implementation, higher values in frequency field 625 may indicate the call sequence is more likely to be performed. In some implementations, frequency values may vary based on the time of day or based on other information.

Sequence update status field 630 may store an indication of when the corresponding call sequence was last updated in table 600. Query request analyzer component 420 may, for example, store the label "NEW" to indicate the call sequence has been newly added to table 600, the label "UPDATED" to indicate that the call sequence was updated or otherwise changed in table 600, and the label "CURRENT" to indicate that the call sequence has recently been observed or verified as occurring in the network.

FIG. 6 illustrates exemplary fields in table 600. In other implementations, table 600 may include additional, fewer, different, or differently arranged fields than those illustrated in FIG. 6 and described herein.

Referring back to FIG. 4, query sequence categorizer component 430 may interact with query request analyzer component 420 to generate a model used to predict DNS requests placed by network components. Query sequence categorizer component 430 may, for example, receive call sequence information from table 600 and apply pattern recognition and/or stochastic control systems/methods to create an adaptive model that anticipates DNS requests from network components. As one example of a DNS query run-time model implemented by query sequence categorizer component 430, consider the situation in which call sequences of a certain type (e.g., REG) or that begin from a certain node (e.g., from a particular radio access node 220) always (or with a high probability) include a DNS request for a domain from radio access node 220 followed by identical DNS requests from a particular MME 240, SGW 230, and GW 260. The model may identify this relationship, and in run-time operation, predict that when a DNS request from radio access node 220 is generated, additional DNS requests from MME 240, SGW 230, and GW 260 are likely to follow.

In run-time operation, query sequence categorizer component 430 may receive DNS requests from network devices. Based on the model, query sequence categorizer component 430 may determine whether the DNS request is one that is likely to trigger additional DNS requests from other network devices. If so, query sequence categorizer component 430 may output predictions describing which network devices are likely to generate DNS requests and what the DNS requests are likely to be.

Service manager component 440 may receive the predicted DNS requests from query sequence categorizer component 430 and may cause appropriate DNS responses to be sent to the network devices associated with the DNS requests. In situations in which network device 300 is implemented as part of DNS 270, service manager component 440 may send the appropriate DNS response to the network device to which the predicted DNS request applies. In situations in which network device 300 is implemented as part of another network device, network device 130 may send a DNS query to DNS 270 on behalf of the network device to which the predicted DNS request applies. DNS 270 may respond by forwarding the DNS response to the network device to which the predicted DNS request applies.

Figure 7:
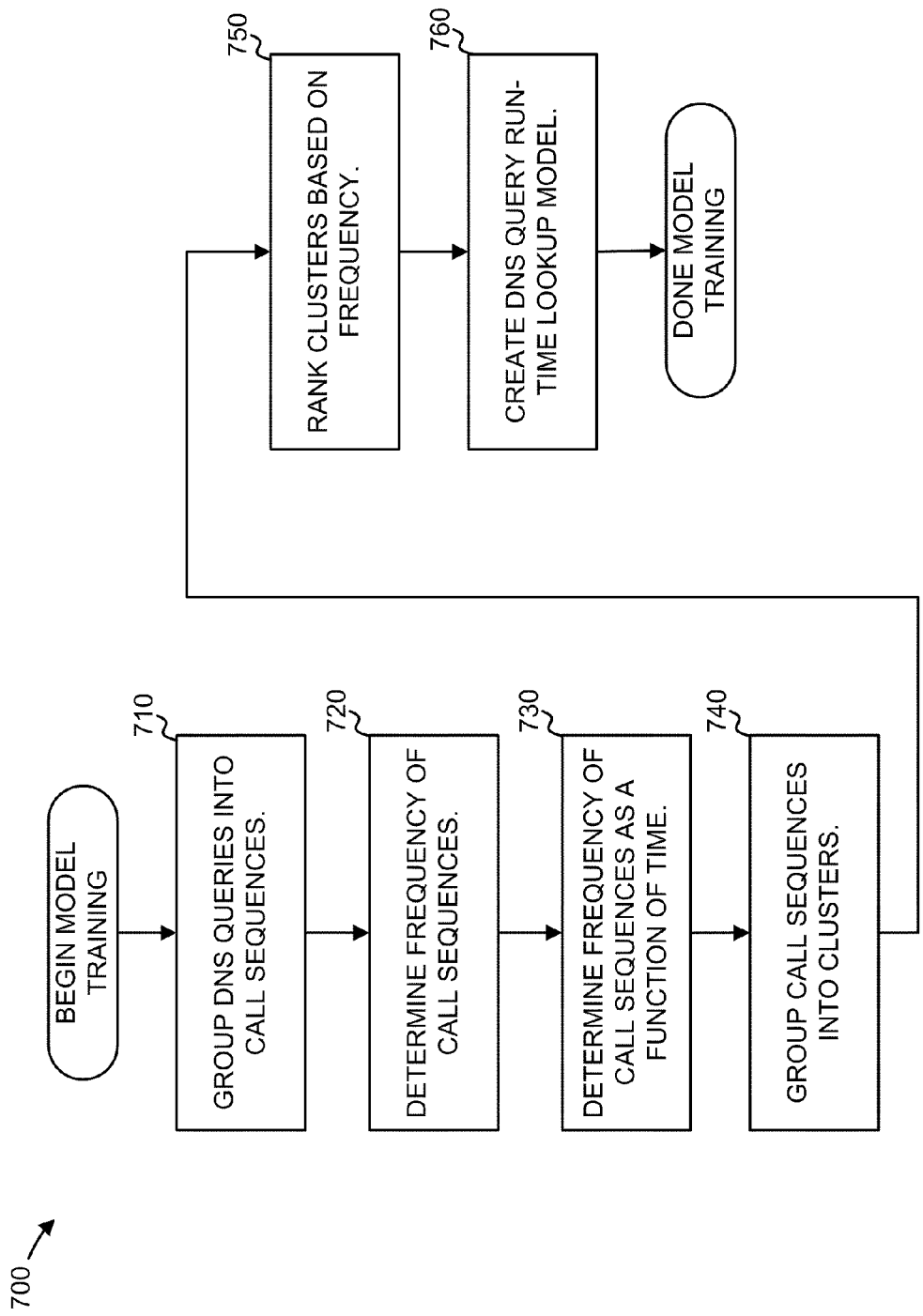
FIG. 7 is a diagram illustrating an exemplary process for creating a model for predicting DNS queries.

FIG. 7 is a diagram illustrating an exemplary process 700 for creating a model for predicting DNS queries. In one implementation, the created model may include or be based on derived information, such as the fields shown in table 600 (FIG. 6). Process 700 may be performed by one or more components of a network device 300. For example, query request analyzer component 420 and query sequence categorizer component 430 may collectively implement process 700.

Process 700 may begin by grouping DNS queries into call sequences to which the DNS queries belong (block 710). In other words, DNS requests that make up a call sequence and the network devices involved in the call sequence may be determined. As previously mentioned, query request analyzer component 420 may group DNS queries into call sequences to which the DNS queries belong based on an analysis of the data in table 500 and/or based on other information, such as known network topology or known call flow data. For example, timestamp field 515 may indicate that a group of DNS queries may reliably occur in short time proximity to one another after an initial DNS query is received. In response, query request analyzer component 420 may associate the corresponding network devices with a call sequence.

The frequency of the call sequences located in block 710 may next be determined (block 720). Query request analyzer component 420 may, for example, count the number of occurrences of each call sequence in a given time period, such as the previous week or month, to determine the relative frequency or likelihood of a call sequence relative to other call sequences. Query request analyzer component 420 may determine the relative frequencies based on, for example, data in table 500. Query request analyzer component 420 may update frequency field 625 to reflect the determined frequencies.

The frequencies of the call sequences may be additionally refined or determined to factor in the time of day (block 730). For example, the frequencies of the call sequences may be calculated as a function based on the time of the day. This can be useful in situations in which time of day is a relevant factor in predicting DNS queries.

The call sequences may be grouped into clusters of call sequences (block 740). For example, query request analyzer component 420 may determine which call sequences are similar to one another based on the sequence type, frequency of the call sequence, and the types of network components in the call sequence. Call sequences assigned to the same sequence group may be call sequences in which the predicted DNS requests for the sequence group may be similarly determined. Similar call sequences may be assigned to a cluster and a label for the cluster may be stored in sequence cluster field 620. Query request analyzer component 420 may maintain sequence cluster field 620.

The clusters may be ranked based on the frequency of the call sequences within the cluster (block 750). Query request analyzer component 420 may, for example, sort the clusters based on frequency field 625.

The ranked clusters may be used to create the predictive DNS query run-time lookup model (block 760). The use of the model in a run-time situation to generate predicted DNS queries will be described in more detail below with reference to FIGS. 8 and 9.

Process 700 illustrates one example of creating a DNS run-time lookup model. It can be appreciated that other techniques could be used to create a model to predict DNS queries. Further, it can be appreciated that various ones of the operations shown in process 700 may be used. For example, for block 730, time of day information may not be relevant to predicting DNS queries and, in this situation, time of day information may not be incorporated into the model.

Figure 8:
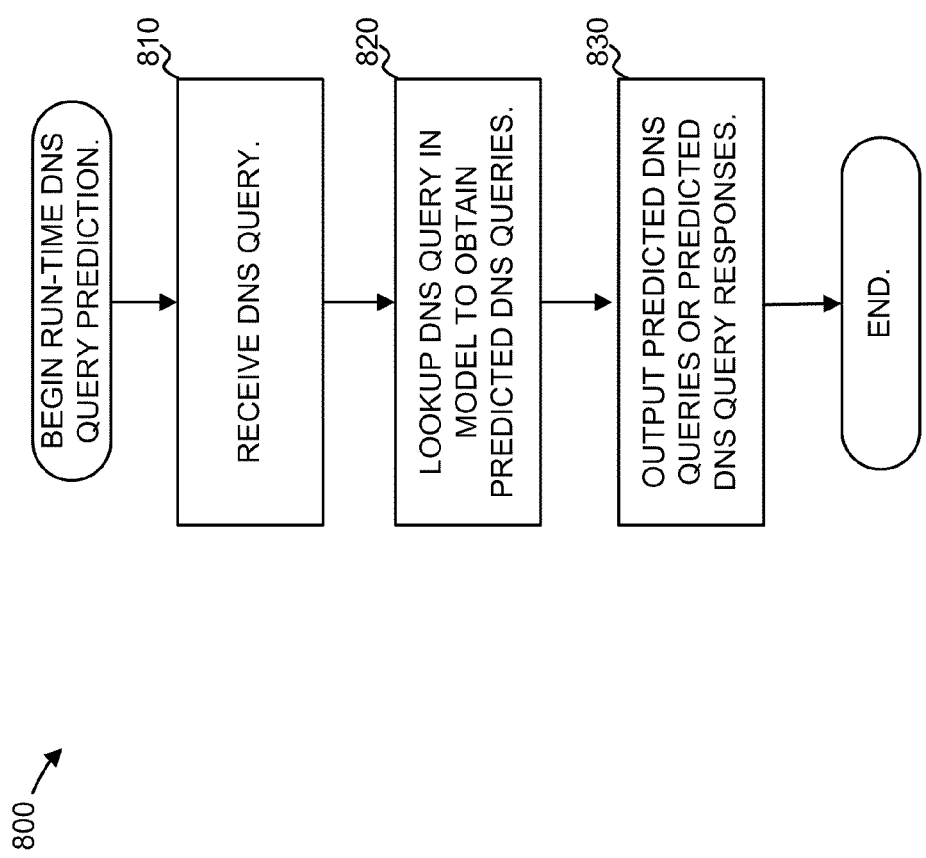
FIG. 8 is a diagram illustrating an exemplary process for using a created model in a run-time situation to predict DNS queries.

FIG. 8 is a diagram illustrating an exemplary process 800 for using a created model in a run-time situation to predict DNS queries. Process 800 may be performed by one or more components of a network device 300. For example, query sequence categorizer component 430 may implement process 800.

DNS queries may be received from components in network 205 (block 810). For example, DNS queries may be received from radio access node 220, SGW 230, MME 240, SGSN 250, or GW 260. Information relating to a received DNS query may include the requested domain to lookup, the source of the query (i.e., the network component that requested the query), the date and time of the query, and/or other network information that is received with or that can be determined based on the DNS query.

Figure 9:
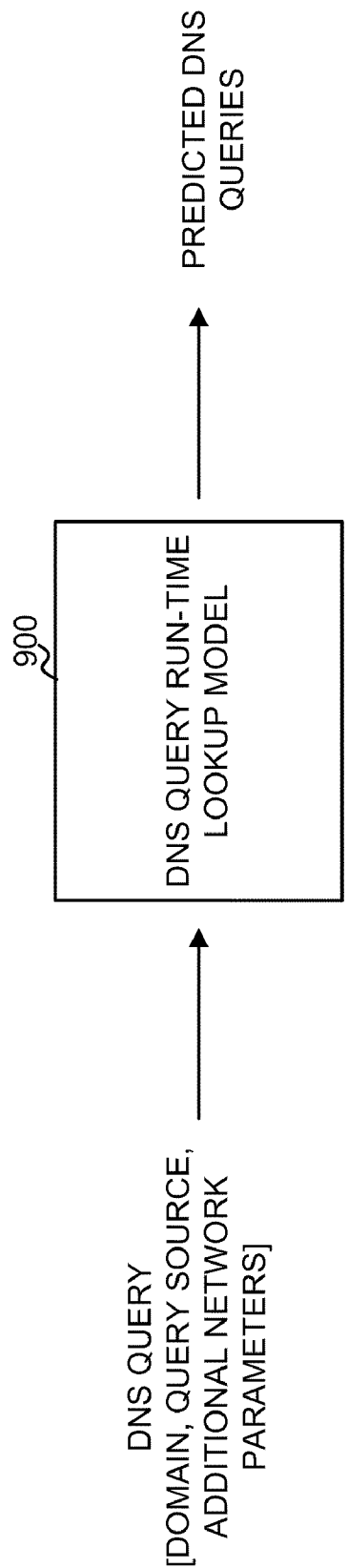
FIG. 9 is a diagram conceptually illustrating operation of a DNS query run-time lookup model.

The received DNS queries may be input to the DNS query run-time lookup model to obtain predicted DNS queries (block 820). FIG. 9 is a diagram conceptually illustrating operation of a DNS query run-time lookup model 900. Model 900 may be generated by, for example, process 700 and stored by query sequence categorizer component 430. As mentioned, model 900 may be represented as, for example, a model that looks-up or matches incoming DNS queries to the ranked clusters determined in blocks 740 and 750. An incoming DNS query may be matched to model 900 and model 900 may output one or more predicted DNS queries based on a highest ranking match.

DNS queries predicted by model 900 may be output (block 830). In situations in which the network device that implements model 900 is integrated within DNS 270, the predicted DNS queries may be directly converted into DNS responses corresponding to the predicted DNS queries (block 830). Each DNS response may then be sent to the network device that was predicted to make the DNS request. Alternatively, in situations in which the network device that implements model 900 is not integrated within DNS 270, the network device may issue DNS requests to DNS 270 on behalf of the network device corresponding to the predicted DNS request.

Figure 10A:
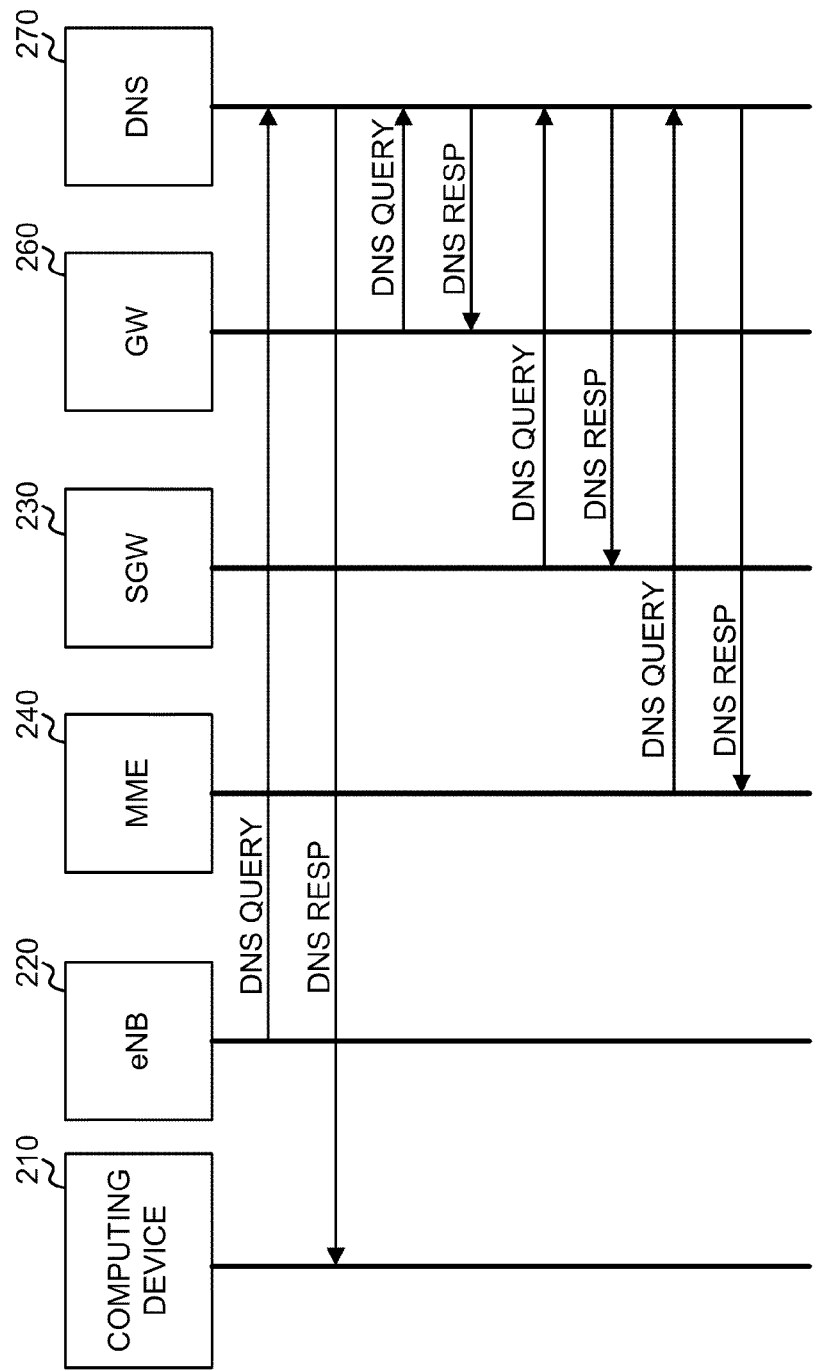
FIGS. 10A and 10B are network flow diagrams illustrating DNS requests and responses made by network devices.
Figure 10B:
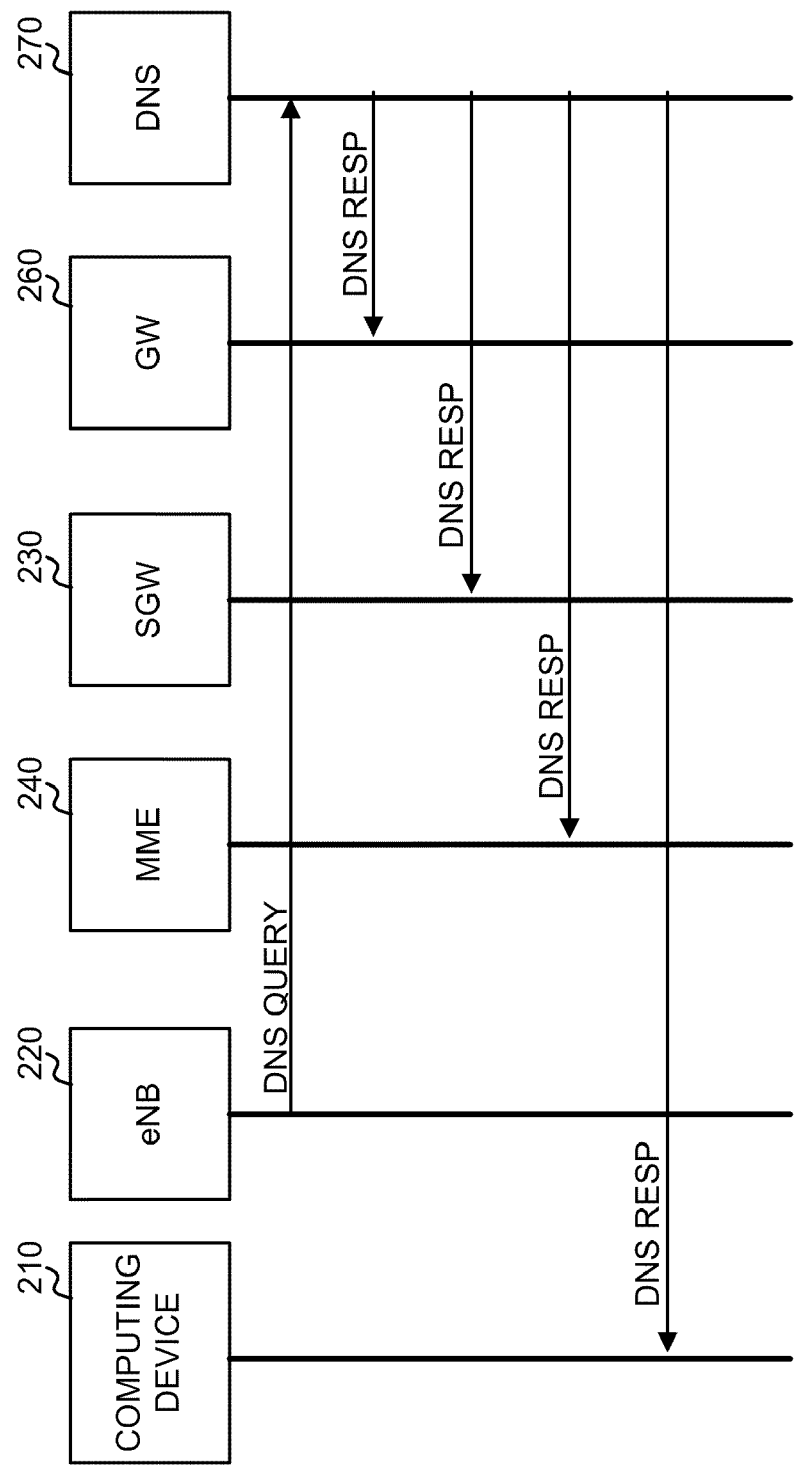

FIGS. 10A and 10B are network flow diagrams illustrating DNS requests and responses made by network devices. In FIG. 10A, DNS requests are made by each network device that requires a DNS response. This may be the situation when, for example, model 900 is not being used or when model 900 is not able to predict a DNS query (e.g., when a new call sequence is first used in the network). In FIG. 10B, DNS predictive DNS responses may be used.

As shown in FIG. 10A, each DNS request (DNS query) to DNS 270 is followed by a corresponding response (DNS RESP) from DNS 270 to the network device that sent the DNS request.

As shown in FIG. 10B, assume a first DNS query from radio access node 220 (possibly on behalf of computing device 210) is issued. DNS 270 may use the DNS query to proactively predict appropriate DNS responses to GW 260, SGW 230, and MME 240. Accordingly, in addition to issuing a DNS response to the initial DNS query, DNS 270 may also transmit DNS responses to GW 260, SGW 230, and MME 240. The responses may include the same IP address that is the result of the initial DNS query or, in some implementations, model 900 may predict that the subsequent DNS queries may be for domain names different than the domain name in the initial DNS query, thus resulting in different returned IP addresses.

Occasionally, one or more of the predicted DNS queries may not be correct. In this situation, DNS server 270 may send unneeded DNS responses to the network devices. This may not adversely affect the communication session, however, as the network device may simply receive and cache the unneeded DNS response. The network device may then issue a DNS query for the needed domain.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIGS. 7 and 8, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device-implemented method, comprising:
   storing, by the network device, a model relating domain name system (DNS) queries to DNS queries that are likely to be subsequently issued by other network devices;
   receiving, by the network device, a first DNS query, to resolve a domain name into an internet protocol (IP) address, the first DNS query being received from a first network device;
   predicting, by the network device and using the model, based on the first DNS query, additional DNS queries that are likely to be issued by the other network devices; and
   transmitting, by the network device and in response to the predicted DNS queries, responses to the predicted DNS queries to the other network devices for which the DNS queries are predicted.

2. The method of claim 1, where the first DNS query is received as part of a call flow of a communication session in a telecommunications network.

3. The method of claim 1, where storing the model includes:
    storing a plurality of DNS queries received by the network device; and
    analyzing the stored plurality of DNS queries to generate the model.

4. The method of claim 3, where analyzing the stored plurality of DNS queries to generate the model further includes:
    grouping the stored DNS queries into call sequences of related DNS queries;
    determining a relative frequency of occurrence of the call sequences;
    grouping the call sequences into clusters of related call sequences; and
    ranking the clusters.

5. The method of claim 4, where predicting the additional DNS queries further includes:
    matching the first DNS query to the ranked clusters of related call sequences to obtain the additional DNS queries.

6. The method of claim 1, further comprising:
    responding, by the network device and to the first network device, to the first DNS query.

7. The method of claim 6, where the response to the first DNS query includes an IP address corresponding to the domain name received as part of the first DNS query.

8. The method of claim 1, where the network device operates as a DNS server in a network.

9. The method of claim 1, where the model includes time-of-day information that is used when predicting the additional DNS queries.

10. A network device comprising:
    a query request storage component to store domain name system (DNS) queries from a plurality of network devices in a network;
    a query request analyzer component to map the DNS queries stored by the query request storage component to a plurality of sequences of DNS queries that correspond to call flows in the network;
    a query sequence categorizer component to, based on the mapping of the DNS queries, generate a model relating DNS queries to DNS queries that are likely to be subsequently issued by other network devices, the query sequence categorizer component additionally using the generated model to predict subsequent DNS queries based on a first received DNS query; and
    a service manager component to transmit responses to the predicted DNS queries to the plurality of network devices for which the DNS queries are predicted.

11. The network device of claim 10, where the network includes devices to implement a wireless telecommunication network.

12. The network device of claim 10, where the first received DNS query is part of a call flow in the network.

13. The network device of claim 10, where the query request analyzer component additionally:
    determines a relative frequency of occurrence of the plurality of sequences of DNS queries;
    groups the plurality of sequences of DNS queries into clusters of related sequences; and
    ranks the clusters of related sequences.

14. The network device of claim 13, where in predicting the subsequent DNS queries, the model matches the first received DNS query to the ranked clusters of sequences to obtain the predicted subsequent DNS queries.

15. The network device of claim 10, where the network device operates as a DNS server in a network.

16. The network device of claim 15, where the network includes a Long Term Evolution (LTE) mobile communication standard network.

17. A network-device-implemented method, comprising:
    generating, by the network device, a model to predict domain name system (DNS) queries in a network call flow based on information received from other network devices involved in the call flow, the model being generated based on a plurality of DNS queries that were previously issued as part of call flows;
    receiving, by the network device, a first communication from a second network device;
    predicting, by the network device and using the model, based on the first communication, additional DNS queries that are likely to be issued by the other network devices; and
    causing, by the network device, responses to the predicted DNS queries to be transmitted to the other network devices.

18. The method of claim 17, where the responses to the predicted DNS queries are transmitted to the other network devices before the other network devices transmit corresponding DNS queries.

19. The method of claim 17, where the first communication includes a DNS query from the second network device.

20. The method of claim 17, where the network device operates as a DNS server in a network.

21. A network device comprising:
    a memory to store a plurality of instructions; and
    a processor to execute instructions in the memory to:
        generate a model relating domain name system (DNS) queries to DNS queries that are likely to be subsequently issued by other network devices;
        receiving a first DNS query, to resolve a domain name into an internet protocol (IP) address, the first DNS query being received from a first network device;
        respond to the first DNS query from the first network device;
        predict, using the model, and based on the first DNS query, additional DNS queries that are likely to be issued by the other network devices; and
        transmit, in response to the predicted DNS queries, responses to the predicted DNS queries to the other network devices for which the DNS queries are predicted.

22. The network device of claim 21, where the responses to the predicted DNS queries are transmitted to the other network devices before the other network devices transmit corresponding DNS queries.

23. The network device of claim 21, where the network device operates as a DNS server in a network.

* * * * *